United States Patent [19]

Corwin

[11] 4,167,743
[45] Sep. 11, 1979

[54] RECORDER PEN SERVICING ACCESSORY

[75] Inventor: William C. Corwin, La Grange, Ill.

[73] Assignee: Beckman Instruments, Inc., Fullerton, Calif.

[21] Appl. No.: 867,201

[22] Filed: Jan. 5, 1978

[51] Int. Cl.² ........................................... G01D 15/16
[52] U.S. Cl. .............................................. 346/140 R
[58] Field of Search ................................... 346/140 R

[56] References Cited

U.S. PATENT DOCUMENTS

| | | | |
|---|---|---|---|
| 3,737,914 | 6/1973 | Hertz | 346/140 R X |
| 3,906,513 | 9/1975 | Siegelman et al. | 346/140 R |

Primary Examiner—George H. Miller, Jr.
Attorney, Agent, or Firm—Robert J. Steinmeyer; Paul R. Harder; Frank J. Kowalski

[57] ABSTRACT

The present invention is an accessory useful in servicing capillary tube type ink pens associated with strip chart recorders and the like. The device can be used to insert an air bubble into the metallic capillary tube pen during periods of nonuse, flush the pen with solvent when necessary, and prime the pen with ink from an ink supply. The device comprises a container for holding a quantity of ink solvent and having an air pump means such as a bellows communicating with the area above the liquid in the container whereby pressure or vacuum can be applied to the interior of the container. A base member communicates with the liquid in the interior of the container and has an extended tube contained therein terminating at the opposite end in an opening containing a bushing designed to snugly mate with the tip of the recorder pen to provide an airtight/watertight seal.

7 Claims, 6 Drawing Figures

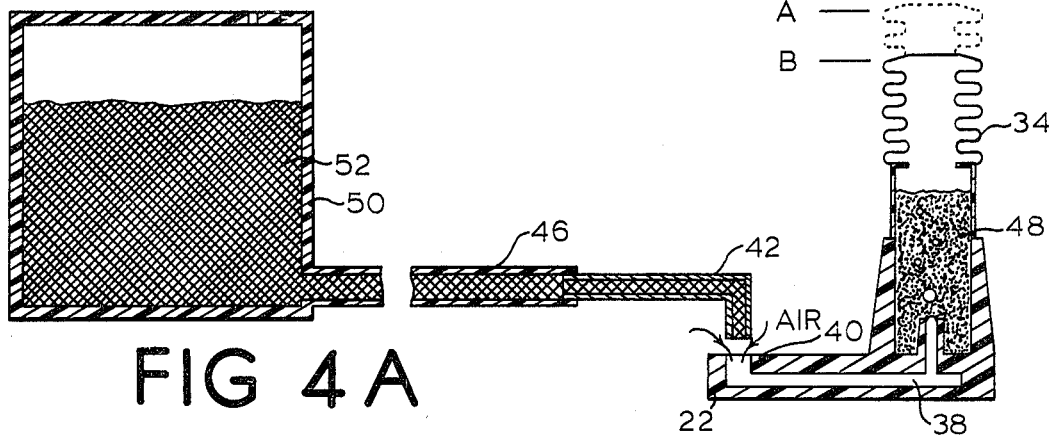
FIG 4A
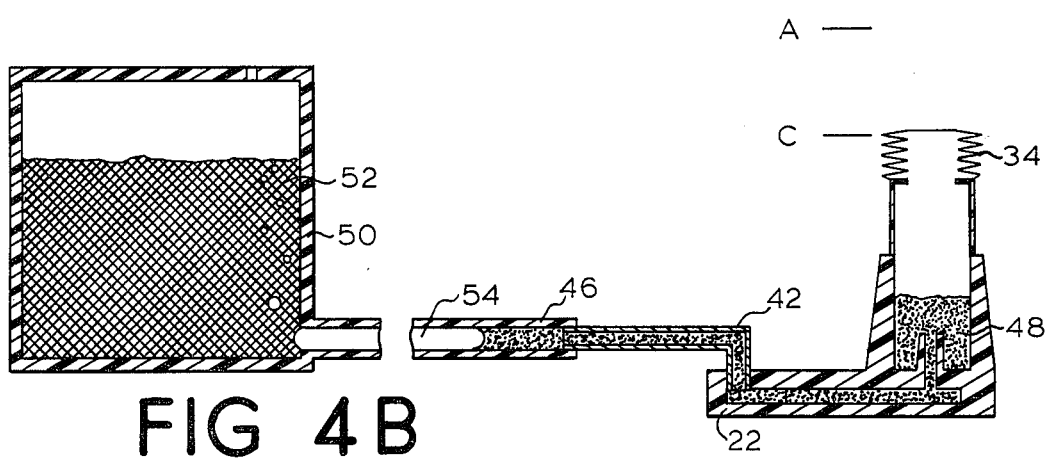
FIG 4B
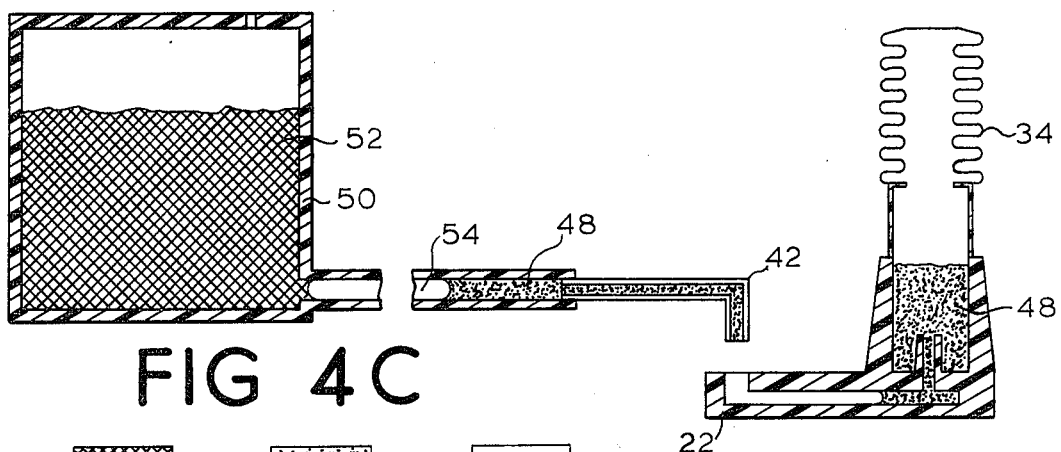
FIG 4C
 INK
 SOLVENT
 AIR

RECORDER PEN SERVICING ACCESSORY

BACKGROUND OF THE INVENTION

The present application relates to pen recorders and more particularly to accessories for use in conjunction with the pen and ink supply of a capillary tube type pen recorder.

A recorder such as wherein the present invention makes a useful accessory is shown in U.S. Pat. No. 3,906,513 to Siegelman et al. which is assigned to the assignee of the present invention. In such apparatus, an electrically operated pen motor drives a pen arm to move a metallic pen tip, comprising a capillary tube, transversely back and forth across a moving chart or recorder paper. The capillary tube pen having the pen tip at one end in contact with the moving chart paper has a capillary tubing connected thereto at the other end which in turn is connected to a supply of ink in an ink chamber. The tubing connecting the metallic pen capillary tube and the ink chamber is typically of polyethylene or polyvinyl chloride. Such recording systems are prone to a number of problems. One is splattering of the ink from the pen tip as the pen tip rapidly changes direction at the extremes of its traverse. Another is skipping caused by rapid movement of the pen tip over the recording paper. In an effort to solve these problems in a system wherein the ink must travel from the ink chamber through a considerable distance of capillary tubing before reaching the tip of the pen, various inks and ink supplying systems such as that described in Siegelman et al. are employed. The various inks and ink supply systems suggested in the art typically solve their particular problem when the system is actively operating. That is, as long as the chart paper is moving and causing ink to move through a well primed capillary tube system from the ink chamber through the capillary tubing to the pen tip, the whole operation continues smoothly.

Once the instrument is turned off for any period of time, however, additional problems present themselves. First, there is the tendency of the system to lose its prime. That is, the ink drains from the capillary tube, from the pen tip, back into the ink chamber, or evaporates through the walls of the tubing, or any combination thereof. As a result, when the instrument is once again started, the pen no longer writes until such time as the continuity of ink between the ink in the supply chamber and the pen tip is re-established. The second problem is the drying of the ink itself within the fine interior capillary passage of the metallic pen portion of the system. Once the ink has dried therein, it is often quite difficult to remove or dissolve the dried ink to restore proper operation to the system. Some prior art solutions to such problems are shown in the following patents:

U.S. Pat. No. 2,308,710—E. P. Nichols
U.S. Pat. No. 2,977,180—W. J. Zenner
U.S. Pat. No. 3,039,438—J. T. L. Brown
U.S. Pat. No. 3,046,556—S. P. Summers, Jr., et al.

The solutions represented by these patents run from the simple to the quite complex. Heretofore, some of the simplest solutions have proved to be the best. One of the most common, still used, is the insertion of a rubber dam under the pen tip during periods of nonactivity. That is, the pen arm is merely lifted off the chart paper, a strip of rubber placed under the pen position and the pen arm lowered back down where the pen tip is in contact with the rubber instead of the paper. In so doing, the ink is not drawn from the pen tip by the rubber as it is by the capillary action of the fibers of the paper.

Another prior art device which has found some acceptance is shown in FIG. 1. In this device, a rubber bulb 10 having a hole 12, such as employed in perfume atomizers and the like, has a hollow rubber adapter 14 fitted thereto. Adapter 14 has a hole 16 communicating between the exterior and the interior thereof wherein a pen tip indicated as 18 can be inserted. In such a device, the pen tip can be inserted, and the bulb 10 squeezed with the user's thumb placed over the hole 12 to cause pressure to be exerted into pen tip 18. It can also be used to draw a vacuum to prime the pen 18 by depressing bulb 10 completely before inserting the tip of pen 18 into hole 16 and thereafter releasing the pressure while maintaining the user's thumb over hole 12 so that a vacuum is drawn in pen 18. While somewhat useful, the device pictured in FIG. 1 is limited in its accomplishments. It is also quite messy.

It is also possible to clean out the tubing connecting the pen with the ink supply by removing the pen, inserting a solvent-filled syringe into the tubing, and applying force to the syringe to force solvent through the tubing. Such a procedure can also be messy to say the least.

Wherefore, it is the object of the present invention to provide an accessory apparatus for use in conjunction with capillary tube ink writing systems which will allow an operator to prime the pen, clean the pen and connecting tubing, and leave the pen in periods of non-use in a condition which will not require excessive effort to re-establish the writing condition.

SUMMARY

The foregoing object has been achieved in the present invention wherein a container is provided for holding a quantity of ink solvent. A pressure/vacuum producing means is attached in communication with the area containing the solvent. An extended capillary passageway is connected with one end communicating with the compartment containing the solvent and the other end communicating with a bushing adapted for close mating airtight/watertight relationship with a capillary type pen tip. Such apparatus can be used to draw a vacuum upon the pen tip and thereby prime the system, flush solvent through the capillary tip and associated tubing to cleanse the system, and force the ink from the capillary tube back into the ink supply replacing it with solvent separated from the ink supply by a buffer of air to prevent dilution of the ink.

DESCRIPTION OF THE DRAWINGS

FIGS. 4(a), 4(b) and 4(c) depict in simplified form the use of the present invention in filling the pen and capillary tubing of a pen recorder with solvent having an air bubble block between the solvent and the ink contained in the ink supply container.

DESCRIPTION OF THE PREFERRED EMBODIMENT

Figure 1:
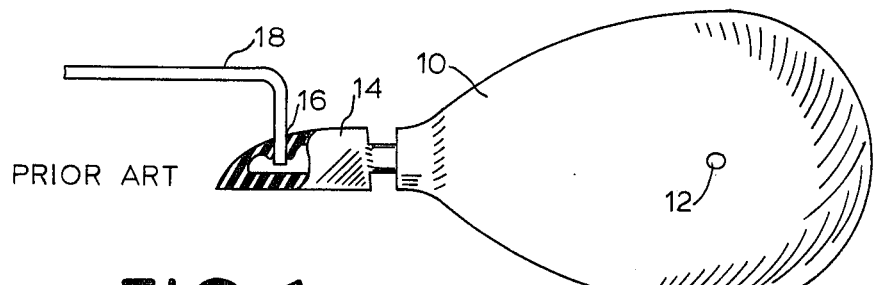
FIG. 1 is a simplified drawing of a bulb type primer according to the prior art.
Figure 3:
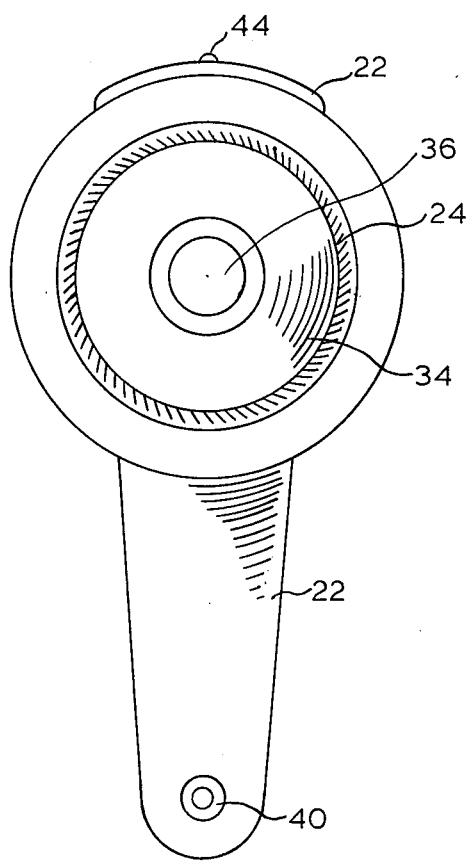
FIG. 3 is a top view of the apparatus of the present invention.
Figure 2:
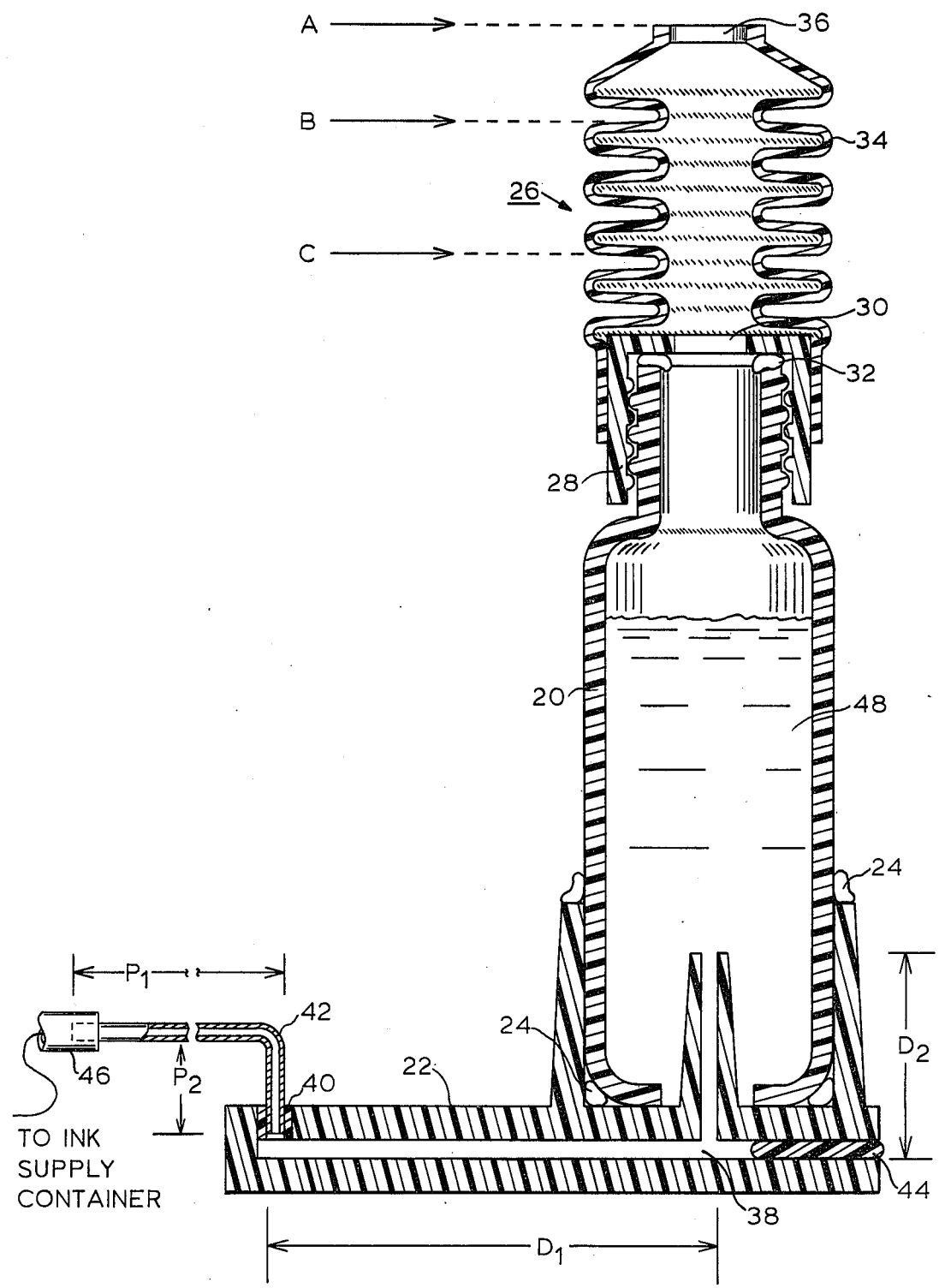
FIG. 2 is a side cutaway of the apparatus of the present invention.

Referring now to FIGS. 2 and 3, the present invention is shown as comprising a bottle 20 having a threaded opening on the top thereof mounted on a base 22. Bottle 20 and base 22 could be constructed as a single piece of material. It was found by applicant, however, that it was simpler to purchase bottle 20 as a commercially available item and attach it to base 22 in the manner shown employing adhesive indicated as 24. The threaded opening on the top of bottle 20 has a cap and bellows assembly generally indicated as 26 adapted to be threaded thereon. Assembly 26 comprises a cap 28 having an opening 30 in the top thereof. A gasket or O-ring 32 is provided between cap 28 and bottle 20 to provide a firm seal therebetween. Cap 28 has a bellows 34 mounted on top having an opening 36 adapted to be closed by finger pressure so as to provide a manually operable valve. In this manner, bellows 34 in conjunction with opening 36 being opened or closed can provide a means for pressurizing or drawing a vacuum within bottle 20 in a manner to be hereinafter discussed in greater detail. Other means such as a piston in a cylinder having a manually operable valve (e.g. a hole to be covered by a finger) could be provided in lieu of the bellows 34 to provide the pressurization and vacuum producing function necessary to the operation of the present invention. The bellows 34 as indicated, however, has been found to be commercially available and provides preferred operation in the present invention. It is preferred that bottle 20, base 22, and bellows and cap assembly 26 be of a plastic material such as polyethylene or polytetrafluoroethylene. It is preferred that at least bottle 20 be of a translucent or transparent nature.

Base 22 is provided with a passageway 38 terminating on one end in communication with the interior of bottle 20 and terminating on the opposite end in an opening fitted with a bushing 40 adapted to provide an airtight-/watertight close mating relationship with a pen tip 42 inserted therein. In this regard, preferred performance has been found by having bushing 40 constructed of polytetrafluoroethylene. In the event that entire base 22 is manufactured of polytetrafluoroethylene, bushing 40 may be eliminated by providing a correctly sized hole communicating with passageway 38 in base 22. Passageway 38 should be of an extended length as indicated by the two dimensions $D_1$ and $D_2$. It is preferred that the total length of the passageway 38 as comprising $D_1$ plus $D_2$ be at least as long as the length of the metallic pen tip 42 which would be the sum of the two indicated dimensions thereof $P_1$ and $P_2$. In the alternative, the distance of passageway 38 $(D_1+D_2)$ should be at least two inches for best operation. If the length of passagway 38 is shorter, the apparatus could be used for its intended purpose but would be more prone to inject solvent into the ink container when the techniques to be hereinafter described are implemented. Thus, for more reliable operation for its intended purpose, the minimum distances suggested should be employed. In constructing passageway 38 and base 22, a standard technique well known in the art can be employed wherein the horizontal bore is made along the run marked by distance $D_1$ from one end of the base 22. The vertical bore is then made intersecting the horizontal bore along the run designated as $D_2$. A plug 44 is then inserted into the horizontal bore as shown and an opening for bushing 40 made to communicate with passageway 38 to provide the configuration shown.

In its relaxed state, bellows 34 is biased by the elasticity of the plastic material into the position shown by the dotted line A. Bellows 34 can be compressed toward the cap 28 until the top thereof reaches its terminal position indicated by the dotted line C. Bellows 34 could, of course, be depressed only to some intermediate level such as that indicated by the dotted line designated as B. By depressing and releasing bellows 34 between the positions indicated as A, B, and C in conjunction with the covering and uncovering of opening 36 such as with a finger to provide a valve action, the foregoing apparatus can be used to accomplish the following functions:

Priming—to prime a pen 42 having no ink therein, bellows 34 is depressed to position C with hole 36 uncovered. Hole 36 is then covered and pen tip 42 inserted into bushing 40. Bellows 34 is then released while maintaining the opening 36 in its covered position whereby the biasing action of bellows 34 toward position A will cause a vacuum to be drawn within bottle 20 communicating through passageway 38 to pen 42 whereby air pressure from the atmosphere on the ink within the ink container (not shown) will force the ink through the capillary tubing indicated as 46 and thence into pen 42. Note that the priming action can be carried out with the bottle 20 in an empty state or partially filled with solvent 48 as indicated in FIG. 2.

Flushing—the apparatus of the present invention is particularly well suited for flushing the interior of pen 42 and the interconnecting capillary tubing 46. Prior to such flushing action, the ink supply container (not shown) should be removed and an empty container substituted to receive the solvent being pumped through the system. To flush the system, bottle 20 is filled with solvent 48 suitable for the ink being used. Pen tip 42 is then inserted into bushing 40 to provide a leak-proof connection. Opening 36 is then covered to act as a closed valve and bellows 34 is depressed from position A to position C to force solvent 48 through passageway 38 and thence into pen 42 then through tubing 46 into the receiving container whereby the entire system is flushed of old ink, residue, etc. The procedure can be repeated as necessary by uncovering bellows opening 36 and allowing bellows 34 to return to position A. The pumping procedure described above is then repeated as necessary.

Preparation for Storage—the use of the present invention in preparing the recorder ink system for extended periods of time without activity can best be understood with simultaneous reference to FIG. 2 and FIG. 4. With bottle 20 containing an appropriate solvent 48 as shown in FIG. 2, bellows 34 is first depressed to an intermediate position B with opening 36 uncovered. Opening 36 is then covered and bellows 34 allowed to return to position A. This will cause passageway 38 to be filled with air as shown in FIG. 4(a). As further shown in FIG. 4(a), a normally operating pen 42, connecting tubing 46, and the ink supply container designated as 50 would contain a continuous path of ink 52 at this time, i.e. immediately after use. Pen 42 is then inserted into bushing 40 of base 22. With opening 36 covered, bellows 34 is depressed from position A toward position C. If bellows 34 reaches position C before bubbles appear in ink container 50, opening 36 is uncovered, bellows 34 allowed to return to position A, opening 36 once again covered, and bellows 34 depressed from position A toward position C. When air bubbles appear in container 50 as shown in FIG. 4(b), the further depressing of bellows 34 is ceased, opening 36 is uncovered and bellows 34 is allowed to return to position A. Pen 42 is then removed from bushing 40 to leave the ink system in the configuration shown in FIG. 4(c). In this manner, the complete capillary and pen passageway 46, 42 is filled with solvent 48 except for the air bubble 54 which prevents solvent 48 from entering container 50 to dilute ink 52. When it is desired to resume operation, the aforedescribed priming technique is used to remove the solvent 48 and replace it with ink 52. If so desired, the air bubble 54 need not be forced all the way through tubing 46 to the entrance to container 50 in the manner shown. For example, air bubble 54 could be lodged only in pen 42 to prevent the drying out of ink within pen 42.

Having thus described my invention, I claim:

1. A recorder pen servicing apparatus for cleaning, priming and preparing the pen and tubing of a capillary tube type pen recorder having a supply of liquid ink, a capillary tube pen, and tubing interconnecting the ink supply and the pen for periods of non-operation comprising:
    (a) a container for holding a quantity of ink solvent;
    (b) means communicating with the interior of said container for applying pressure and for drawing a partial vacuum within said container;
    (c) a bushing adapted to receive the tip of the pen in snug, close fitting relationship; and,
    (d) conduit means for connecting the interior of said container with said bushing.

2. The recorder pen servicing apparatus as claimed in claim 1 and additionally comprising:
    a base having said bushing and said conduit means disposed therein and said container disposed thereon.

3. Apparatus for servicing a recorder pen comprising:
    (a) a base assembly having a bushing adapted to receive the tip of a recorder pen in a snug close mating relationship to provide an airtight/watertight seal, said base assembly further having a sealable container incorporated therein for holding a quantity of ink solvent and a passageway communicating between said bushing and the interior of said container; and
    (b) a cap adapted to seal said container and including means for pressurizing and for drawing a partial vacuum within said container.

4. The apparatus of claim 3 wherein:
    said means for pressurizing and for drawing a partial vacuum comprises a bellows having manually operable valve means.

5. The apparatus of claim 3 wherein:
    said means for pressurizing and for drawing a partial vacuum comprises a piston in a cylinder having manually operable valve means.

6. The method of servicing the pen and tubing of a capillary tube type pen recorder having a supply of liquid ink, a capillary tube pen, and tubing interconnecting the ink supply and the pen for extended periods of non-operation comprising the steps of:
    (a) drawing a partial vacuum in a container having ink solvent therein and having a conduit communicating at one end with the solvent in the container whereby the conduit is at least partially filled with air;
    (b) inserting the tip of the pen into the other end of the conduit;
    (c) pressurizing the interior of the container until air and solvent are introduced into the capillary tube pen and interconnecting tubing;
    (d) removing the pressure from the interior of the container; and,
    (e) removing the tip of the pen from the other end of the conduit whereby the pen and tubing will be partially filled with solvent and an air bubble will be left in the tubing adjacent the supply of ink to block the solvent from entering and diluting the supply of ink.

7. The method of claim 6 wherein the pressurization of said container is continued until air is introduced into the supply of liquid ink.

* * * * *